(12) United States Patent
Knapp

(10) Patent No.: US 10,876,284 B2
(45) Date of Patent: Dec. 29, 2020

(54) CONNECTOR FOR TRANSVERSELY SCREWING TOGETHER TWO WORKPIECES

(71) Applicant: Knapp GmbH, Euratsfeld (AT)

(72) Inventor: Friedrich Knapp, Bad Kreuzen (AT)

(73) Assignee: Knapp GmbH, Euratsfeld (AT)

( * ) Notice: Subject to any disclaimer, the term of this patent is extended or adjusted under 35 U.S.C. 154(b) by 0 days.

(21) Appl. No.: 16/488,227

(22) PCT Filed: Feb. 23, 2018

(86) PCT No.: PCT/EP2018/054469
§ 371 (c)(1),
(2) Date: Aug. 22, 2019

(87) PCT Pub. No.: WO2018/166773
PCT Pub. Date: Sep. 20, 2018

(65) Prior Publication Data
US 2019/0390455 A1  Dec. 26, 2019

(30) Foreign Application Priority Data
Mar. 17, 2017 (EP) .................................. 17161537

(51) Int. Cl.
*E04B 1/38* (2006.01)
*E04B 1/41* (2006.01)
(Continued)

(52) U.S. Cl.
CPC ............... *E04B 1/40* (2013.01); *F16B 5/121* (2013.01); *E04B 2001/2652* (2013.01);
(Continued)

(58) Field of Classification Search
CPC ...... E04B 1/40; E04B 2001/2652; E04B 1/26; F16B 5/121; F16B 5/02; F16B 12/14;
(Continued)

(56) References Cited

U.S. PATENT DOCUMENTS 4,089,614 A * 5/1978 Harley .................... F16B 12/16
403/231
4,505,610 A * 3/1985 Rock ................... F16B 12/2036
403/231

(Continued)

FOREIGN PATENT DOCUMENTS

DE 102009022161 A1 12/2010
EP 2799636 A1 11/2014

OTHER PUBLICATIONS

International Search Report for PCT/EP2018/054469, dated Mar. 22, 2018, (2 pages).

*Primary Examiner* — Patrick J Maestri
(74) *Attorney, Agent, or Firm* — Invention Mine LLC

(57) ABSTRACT

The present disclosed subject matter relates to a connector for transversely screwing together two workpieces, comprising a main body having a base surface, a cover surface parallel thereto, and a substantially generally-cylindrical lateral surface connecting the base and cover surfaces for shape-fitting insertion into a generally-cylindrical blind hole in one of the workpieces. The connector further comprises a first bore for a screw, said bore passing through the main body at an acute angle to the base and cover surfaces, and at least two second bores for a further screw each. Said second bores flank the first bore and pass through the main body approximately perpendicularly to the base and cover surfaces.

14 Claims, 2 Drawing Sheets

(51) Int. Cl.
*F16B 5/12* (2006.01)
*E04B 1/26* (2006.01)
*F16B 5/02* (2006.01)
*F16B 12/14* (2006.01)
*F16B 43/02* (2006.01)

(52) U.S. Cl.
CPC .................. *F16B 5/02* (2013.01); *F16B 12/14* (2013.01); *F16B 43/02* (2013.01)

(58) Field of Classification Search
CPC ...... F16B 43/02; F16B 5/0004; F16B 5/0008; F16B 5/0275; F16B 5/0258; F16B 2012/106
See application file for complete search history.

(56) References Cited

U.S. PATENT DOCUMENTS

| | | | | |
|---|---|---|---|---|
| 4,576,506 A | * | 3/1986 | Rock | F16B 12/2036 403/245 |
| 4,579,474 A | * | 4/1986 | Rock | F16B 12/2036 403/245 |
| 2015/0211567 A1 | * | 7/2015 | Susnjara | F16B 25/0015 411/411 |

* cited by examiner

US 10,876,284 B2

CONNECTOR FOR TRANSVERSELY SCREWING TOGETHER TWO WORKPIECES

CROSS-REFERENCE TO RELATED APPLICATIONS

This application is a National Phase application of International Application No. PCT/EP2018/054469 filed Feb. 23, 2018 which claims priority to the European Patent Application No. 17 161 537.0 filed Mar. 17, 2017, the disclosures of which are incorporated herein by reference.

TECHNICAL FIELD

The present disclosed subject matter relates to a connector for transversely screwing together two workpieces.

BACKGROUND ART

Two workpieces, for example wood workpieces, can be connected to one another for example in abutment or mitred, with an overlap, for example with a tongue and groove, mortise and tenon, finger joints, or the like, or with undercuts, for example a dovetail joint, dovetailed housing, or the like. In order to increase the stability the connection can additionally be adhesively bonded or glued, dowelled, nailed and/or screwed. It is also known to lay a plate—for example made of metal—over a connection point between two workpieces and to screw it to both workpieces or to nail it to the workpieces. If screws or nails are arranged at a right angle to the metal plate, they are loaded by an unfavourable shear loading as a result of tensile forces of both workpieces.

A special case for a connection with screwed metal plate is constituted by transverse screwing, in which case the screws are rotated at an acute angle through the metal plate into the corresponding workpiece so that each screw points away from the connection point. In order to be able to more easily maintain the acute angle provided for the transverse positioning of the screws it is also known to incorporate additional guide elements into the metal plate or for example to insert such guide elements in the form of angled shims. In the case of transverse screwing, the screws—depending on the transverse position are loaded substantially by tensile force and are subjected only to a small extent, if at all, to shear stress, whereby the screws can take up greater forces than in the case of a right-angled screwed connection, and a stable connection of the workpieces is attained.

However, such transverse screwed connections require a high material and consequently transportation and storage cost due to the plate, guide elements and screws, and often remain clearly visible at the surface, which is irritating. Furthermore, when producing such transverse screwed connections, localisation errors and even omissions of individual transverse screwed connections can occur, without this being immediately noticeable on a finished structure formed from a plurality of workpieces. The load-bearing capability of the connection is thus reduced unpredictably. In addition, when working above head height, precautions must be taken in order to prevent parts that are initially loose from falling down.

EP 2 799 636 A1 discloses a connector in which a generally-cylindrical main body is penetrated transversely by four star-shaped connection screws extending away from one another. The connector is anchored by means of two of the connection screws to a workpiece and is screwed by means of the two other connection screws to the adjacent other workpiece. Between the connection screws, the main body optionally has openings or perpendicular positioning screws.

BRIEF SUMMARY

The objective of the disclosed subject matter is to create a connector for transversely screwing together two workpieces which saves material and can be used easily and reliably.

This objective is achieved in accordance with the disclosed subject matter by a connector comprising a main body having a base surface, a cover surface parallel thereto, and a substantially generally-cylindrical lateral surface connecting the base and cover surfaces for shape-fitting insertion into a generally-cylindrical blind hole in one of the workpieces, and comprising a first bore for a screw, said bore passing through the main body at an acute angle to the base and cover surfaces, which connector has at least two second bores for a further screw each, said second bores flanking the first bore and passing through the main body approximately perpendicularly to the base and cover surfaces.

A metal plate spanning the connection point of the two workpieces can thus be spared. The connector, with suitable blind hole depth, is inserted into the blind hole flush with the workpiece and is only slightly visible; nevertheless, a defective arrangement of the connector with prefabricated blind holes is ruled out and an unplanned omission of individual connectors will be immediately visible, since blind holes will remain unoccupied. The connector transfers the forces from the transverse screwed connection of one workpiece via the first bore and the lateral surface directly to the wall of the blind hole in the other workpiece, to which the main body is fixedly anchored in the second bores with the aid of the further screws. These further screws in the second bores fix the workpiece around the blind hole and for example prevent it from splitting and prevent the main body from sinking into the wall of the blind hole and tilting as a result of the tensile forces of the transverse screwed connection. The connector for transverse screwed connections can be used not only for workpieces made of wood, but also for those made of other materials, for example plastic, composite material or even metal.

It is particularly favourable if the cover and lateral surfaces have a chamfer, from which said first bore starts. Such a chamfer helps to avoid a (excessive) overhang of the head of a screw rotated through the first bore beyond the main body of the connector and can also ensure that the screw head sits on the connector in a manner corresponding to the specified angle.

The base surface of the connector may be substantially round. A complementary round blind hole in the workpiece can be produced particularly easily, for example subsequently by drilling or milling. The introduction of force of a round connector into the workpiece is also favourable since local force peaks, which would occur for example in the case of angular connectors, are avoided.

In an advantageous variant of the connector the specified acute angle is between 15 and 60 degrees, optionally approximately 30 degrees. Such an angle leads to a favourable force effect of the transverse screwed connection on the workpieces.

The main body, on its lateral surface, has V ribs running perpendicularly to the base and cover surfaces, which ribs taper in the direction of the base surface. The connector, when inserted into the blind hole is thus wedged and does not fall out from the workpiece before the screws are screwed in, even when working above head height. A simple, self-centring insertion is made possible as a result of the tapering.

It is also advantageous if the main body, on its lateral surface, has notches which run perpendicular to the base and cover surfaces and which taper in the direction of the base surface. Such notches cause an additional interlocking splaying of the main body in the blind hole under tensile force.

In order to centre the screws, said first bore and/or said second bores are optionally countersunk in order to receive the screw heads.

A particularly favourable force distribution of the connector over the wall of the blind hole is produced if said first bore passes through the base surface. In this case the lateral surface of the connector, on its side loaded to the greatest extent, engages edge-free with the wall of the blind hole in the direction of the transverse screwed connection, whereby the risk of splitting of the workpiece with blind hole is reduced.

A further embodiment of the connector is characterised by a shim for placement beneath the main body in the blind hole of the workpiece, which shim has a cylinder portion, which is congruent with the base surface of the main body, with a slot in the extension of said first bore of the main body and with bores flanking the slot in the extension of said second bore of the main body, and has a tongue portion, which protrudes from the cylinder portion and which is penetrated approximately perpendicularly by at least one third bore.

The blind hole is adapted here in its cross-section to the shape of the shim. The shim, which can be placed beneath the main body into the blind hole leads to a further improved anchoring of the connector in the blind hole. The connector and screws can thus be selected to be smaller, or the blind hole can even be placed in a manner spanning the workpieces, so that the connector prevents a mutual displacement of the workpieces already at the time of assembly.

In a particularly stable embodiment the connector is made of metal, in particular of aluminium.

BRIEF DESCRIPTION OF THE DRAWINGS/FIGURES

The disclosed subject matter will be explained in greater detail hereinafter with reference to exemplary embodiments shown in the accompanying drawings, in which.

Figure 1:
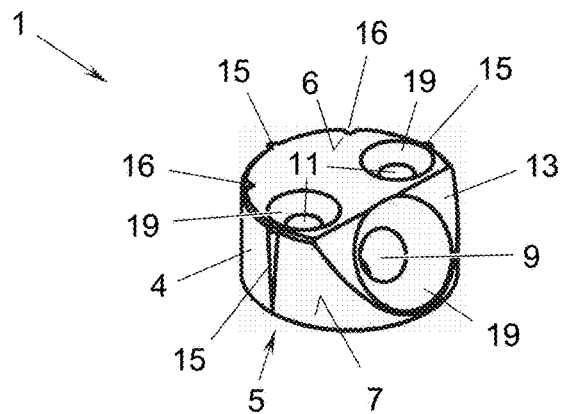
FIG. 1 shows a main body of a connector according to the disclosed subject matter for transversely screwing together two workpieces in a perspective view obliquely from above.
Figure 4:
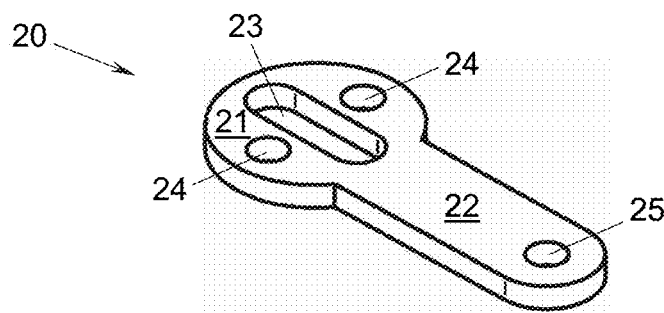
Figure 5:
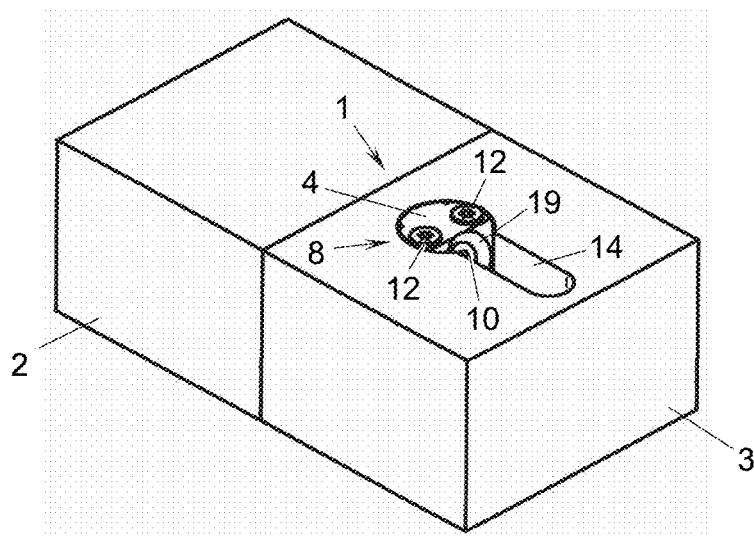
Figure 6:
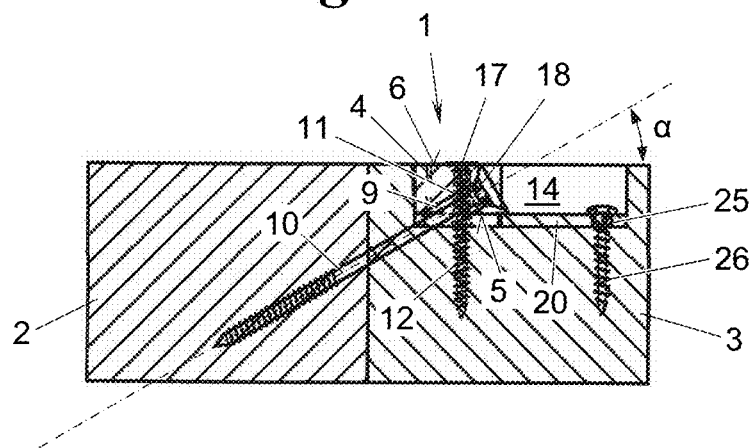

FIG. 4 shows a shim of the connector for placement beneath the main body from FIG. 1 in a perspective view obliquely from above; and FIGS. 5 and 6 show the connector with main body according to FIG. 1 and shim according to FIG. 4 in the position inserted into the blind hole of one workpiece and screwed to the second workpiece in a perspective view obliquely from above (FIG. 5) and in a longitudinal section (FIG. 6).

DETAILED DESCRIPTION

Figure 2:
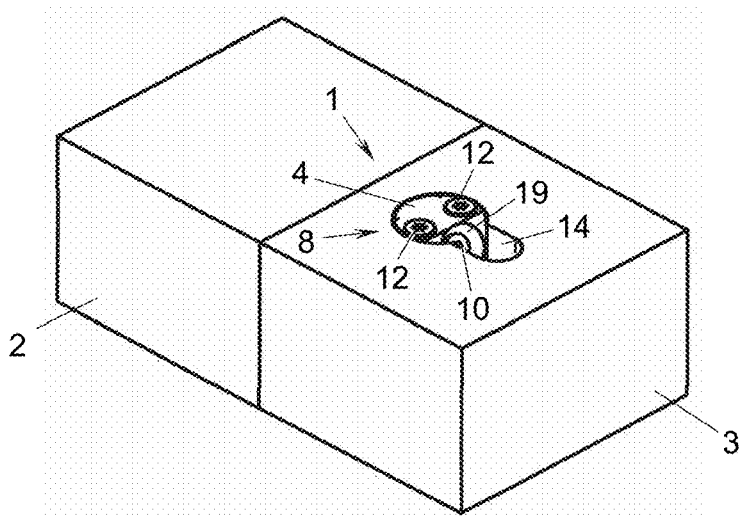
FIGS. 2 and 3 show the connector from FIG. 1 in a position inserted into a blind hole of a workpiece and screwed to a second workpiece in a perspective view obliquely from above (FIG. 2) and in a longitudinal section (FIG. 3)
Figure 3:
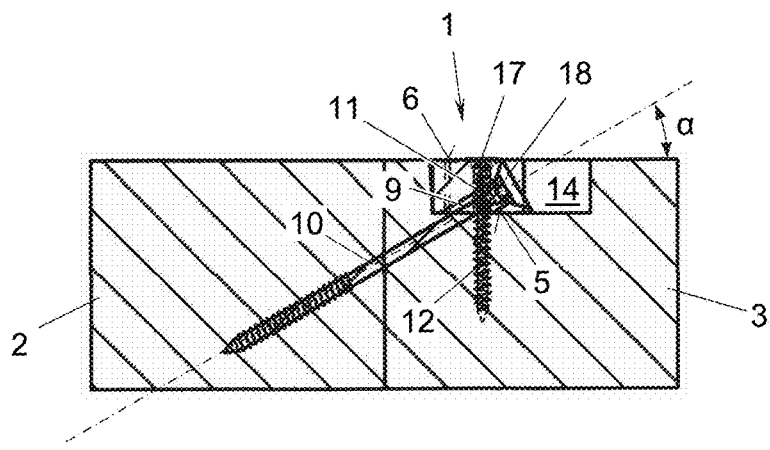

FIGS. 1 to 3 show a first embodiment of a connector 1 for transversely screwing together two workpieces 2, 3. The connector 1 has a main body 4 with a base surface 5 (FIG. 3), a cover surface 6 parallel to the base surface 5, and a generally-cylindrical lateral surface 7 connecting the base surface 5 and the cover surface 6. The main body 4 is inserted with shape-fit into a generally-cylindrical blind hole 8 of one of the workpieces 2, 3; here: into a blind hole 8 of the right workpiece 3.

The connector 1 has a first bore 9 for a screw 10, said bore passing through the main body 4 at an acute angle α to the base and cover surfaces 5, 6. The connector 1 also has at least two second bores 11 for a further screw 12 each, said second bores flanking the first bore 9 and passing through the main body 4 approximately perpendicularly to the base and cover surfaces 5, 6.

Said acute angle α to the base and cover surfaces 5, 6, at which angle the first bore 9 passes through the main body 4, is optionally between 15 and 60 degrees, in the example of FIG. 3 approximately 30 degrees.

In the example of FIGS. 1 to 3 the base surface 5 of the main body 4 is substantially round. Here, the cover and lateral surfaces 6, 7 of the main body 4 have a chamfer 13, from which the first bore 9 starts approximately at a right angle. Alternatively, the base surface 5 for example could be oval or polygonal and/or the first bore 9 could start from the cover surface 6 or the lateral surface 7.

The blind hole 8 in the example of FIGS. 2 and 3 has a predominantly round cross-section and an optional recess 14 in order to enable or facilitate the screwing of the screw 10 into the first bore 9. Alternatively the blind hole 8 could have a different cross-sectional shape, for example oval or polygonal. Furthermore, the blind hole 8 for shape-fitting insertion of the connector 1 does not necessarily need to have a cross-section matching the base surface 5 of the main body 4.

In an alternative variant (not shown) the main body has more than one first bore 9 passing through the main body 4 at an acute angle α to the base and cover surfaces 5, 6. The two or more first bores 9 for example can start from the optional chamfer adjacently to one another or equally can be arranged one above the other, so that a first bore 9 could start from the optional chamfer 13, a further first bore 9 could start from the cover surface 6 or a recess (not shown) therein, and/or a further first bore 9 could start from the lateral surface 7. The one or more first bores 9 are flanked each by two or more second bores 11, wherein in the case of a plurality of adjacently arranged first bores 9 some of the second bores 11 could also sit between the first bores 9.

In the example of FIG. 1 the main body 4 on its lateral surface 7 has optional V ribs 15, which run perpendicularly to the base and cover surfaces 5, 6 and which taper in the direction of the base surface 5. The V ribs 15 are distributed here over the lateral surface 7 as necessary, in order to wedge the connector 1 in the blind hole 8 at the time of insertion into same.

The main body 4, if desired, can also have notches 16 on its lateral surface 7, which run perpendicularly to the base and cover surfaces 5, 6 and which likewise taper in the direction of the base surface 5. The optional notches 16 are also distributed over the lateral surface 7 as necessary.

The first and/or second bores 9, 11 are optionally countersunk in order to receive the heads 17, 18 of the screw 10 for the first bore 9 or of the further screws 12 for the second bores 11, i.e. they each have a countersink 19 for the screw heads 17, 18.

In the connector 1 according to the example of FIG. 3 the first bore 9 passes through the base surface 5 of the main body 4. With a different shape of the main body 4, for example a taller lateral surface 7, a smaller base surface 5, a more pronounced chamfer 13 and/or a smaller angle α, the first bore could alternatively pass through the lateral surface 7 at least in part.

In the alternative embodiment according to FIGS. 4 to 6, in which the same parts bear the same reference signs as in FIGS. 1 to 3, the connector 1 also comprises a shim 20 for placement beneath the main body 4 in the blind hole 8 of the workpiece 3. The shim 20 has a cylinder portion 21 and a tongue portion 22 protruding from the cylinder portion 21.

The cylinder portion 21 is substantially congruent with the base surface 5 of the main body 5. The main body 4 rests on said cylinder portion in the blind hole 8. In the extension of said first bore hole 9 in the main body 4 the cylinder portion 21 has a slot 23 which, similarly to the first bore 9, is penetrated by the screw 10 in its screwed-in state (FIG. 6). In the case of a particularly acute angle α the slot 23 could optionally be a slot open on one side.

In the cylinder portion 21 of the shim 20 the slot 23 also is flanked by bores 24 in the extension of said second bores 11 in the main body 4. As shown in the example of FIG. 6 the bores 24 are penetrated by the further screws 12, received in the second bores 12, in their screwed-in-state. The tongue portion 22 of the shim 20 is passed through approximately perpendicularly by a third bore 25 for an additional screw 26. It goes without saying that the tongue portion 22 can also have two or more third bores 25 for additional screws 26.

The blind hole 8 in the variant according to FIGS. 4 to 6 of the connector 1 is adapted to the cross-section of said connector, even if not necessarily congruent. If, as in the shown example, the tongue portion 22 is narrower than the cylinder portion 21, the blind hole 8 can thus optionally reflect this in its cross-section, as in the example of FIG. 5. Here, the portion of the blind hole 8 for the tongue portion 22 simultaneously takes on the function of the recess 14 for screwing in the screw 10 for the transversely screwed connection.

In this variant of the connector 1 the blind hole 8 and connector 1, if desired, can span the workpieces, i.e. can lie in the left workpiece 2 at least to a small extent and for the rest can lie in the right workpiece 3 (not shown).

In the shown examples the depth of the blind hole 8 corresponds to the height of the lateral surface 7 of the main body or the sum of the height of the lateral surface 7 of the main body 4 and thickness of the shim 20, so that the cover surface 6 of the main body 4, after insertion thereof into the blind hole 8, finishes flush with both workpieces 2, 3. A flush finishing of this kind, however, is not necessary for the function of the connector 1. The main body 4 of the connector 1 could therefore alternatively protrude out from the blind hole 8 once fully inserted therein, i.e. the main body 4 (as applicable, together with the shim 20) could be taller than the blind hole 8 is deep, or could be countersunk therein, i.e. the main body 4 (as applicable, together with the shim 20) could be shorter than the blind hole 8 is deep. The connector 1 is furthermore also usable for workpieces 2, 3 which are not flush with one another, but for example are arranged adjacently to one another in a stepped manner.

In the shown examples the workpieces 2, 3 are made of wood, but could alternatively be made of plastic, composite material or, with suitable transverse screwing, could even be made of metal and at the same time optionally of different materials.

The connector 1 is made of aluminium in the examples, however, it could be made alternatively of another material or of plastic or composite material. Furthermore, in the example of FIGS. 4 to 6 the main body 4 and shim 20 could be made of different materials.

The disclosed subject matter is not limited to the presented embodiments, but includes all variants, combinations and modifications which fall within the scope of the accompanying claims.

What is claimed is:

1. A connector for transversely screwing together two workpieces, comprising:
   a main body having a base surface, a cover surface parallel to the base surface, and a cylindrical lateral surface connecting the base surface and the cover surface for shape-fitting insertion into a cylindrical blind hole in one of the workpieces;
   a first bore for a screw, said first bore passing through the main body at an acute angle to the base and cover surfaces; and
   at least two second bores each of which for a respective further screw, said second bores flanking the first bore and passing through the main body perpendicularly to the base and cover surfaces.

2. The connector according to claim 1, wherein the cover and lateral surfaces have a chamfer, from which the first bore starts.

3. The connector according to claim 1, wherein the base surface is round.

4. The connector according to claim 1, wherein said acute angle is between 15 and 60 degrees.

5. The connector according to claim 1, wherein the main body has V ribs on its lateral surface which run perpendicularly to the base and cover surfaces and which taper in the direction of the base surface.

6. The connector according to claim 1, wherein the main body has notches on its lateral surface which run perpendicularly to the base and cover surfaces and which taper in the direction of the base surface.

7. The connector according to claim 1, wherein at least one of said first and second bores is countersunk in order to receive a screw head.

8. The connector according to claim 1, wherein said first bore passes through the base surface.

9. The connector according to claim 1, further comprising a shim for placement beneath the main body in the blind hole of the workpiece, wherein the shim has a cylinder portion, which is congruent with the base surface of the main body, with a slot in the extension of said first bore of the main body and with bores flanking the slot in the extension of said second bores of the main body, and has a tongue portion which protrudes from the cylinder portion and which is penetrated perpendicularly by at least one third bore.

10. The connector according to claim 1, wherein the connector is made of metal.

11. The connector according to claim 1, wherein the connector is made of aluminium.

12. The connector according to claim 1, wherein said acute angle is 30 degrees.

13. The connector according to claim 2, wherein said first bore passes through the base surface.

14. The connector according to claim 13, wherein said acute angle is between 15 and 60 degrees.

* * * * *